(12) United States Patent
Horikoshi et al.

(10) Patent No.: US 10,345,954 B2
(45) Date of Patent: Jul. 9, 2019

(54) DEVICE, METHOD AND COMPUTER PROGRAM PRODUCT FOR DISPLAY OF ELECTRONIC INFORMATION

(71) Applicant: LENOVO (Singapore) PTE. LTD., New Tech Park (SG)

(72) Inventors: Seita Horikoshi, Zama (JP); Ryo Oshige, Machida (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/454,839

(22) Filed: Mar. 9, 2017

(65) Prior Publication Data

US 2017/0262123 A1  Sep. 14, 2017

(30) Foreign Application Priority Data

Mar. 9, 2016 (JP) .................................. 2016-45896

(51) Int. Cl.
*G06F 3/041* (2006.01)
*G06F 3/0483* (2013.01)

(52) U.S. Cl.
CPC .......... *G06F 3/0416* (2013.01); *G06F 3/0412* (2013.01); *G06F 3/0483* (2013.01); *G06F 2203/04102* (2013.01); *G06F 2203/04105* (2013.01)

(58) Field of Classification Search
None
See application file for complete search history.

(56) References Cited

U.S. PATENT DOCUMENTS

| 2010/0141605 | A1* | 6/2010 | Kang | G06F 1/1626 |
| | | | | 345/174 |
| 2011/0050591 | A1* | 3/2011 | Kim | G06F 3/0488 |
| | | | | 345/173 |
| 2013/0222416 | A1* | 8/2013 | Kim | G09G 3/20 |
| | | | | 345/619 |

FOREIGN PATENT DOCUMENTS

| JP | 2003015795 A | 1/2003 |
| JP | 2004046792 A | 2/2004 |
| JP | 2007108441 A | 4/2007 |
| JP | 2013058082 A | 3/2013 |
| JP | 2014041569 A | 3/2014 |

\* cited by examiner

*Primary Examiner* — Gustavo Polo
(74) *Attorney, Agent, or Firm* — Kunzler Bean & Adamson

(57) ABSTRACT

An apparatus, method and computer program product are disclosed. The apparatus includes a touch display that displays information in pages, a first detection section to detect an external force to the touch display, and a control section that performs page turning of the information. The method includes detecting an external force applied to a touch display of a device that displays information in pages, and performing page turning of the information. The computer program product includes code to detect an external force applied to a touch display of a device that displays information in pages, and to perform a page turning operation on the information.

20 Claims, 12 Drawing Sheets

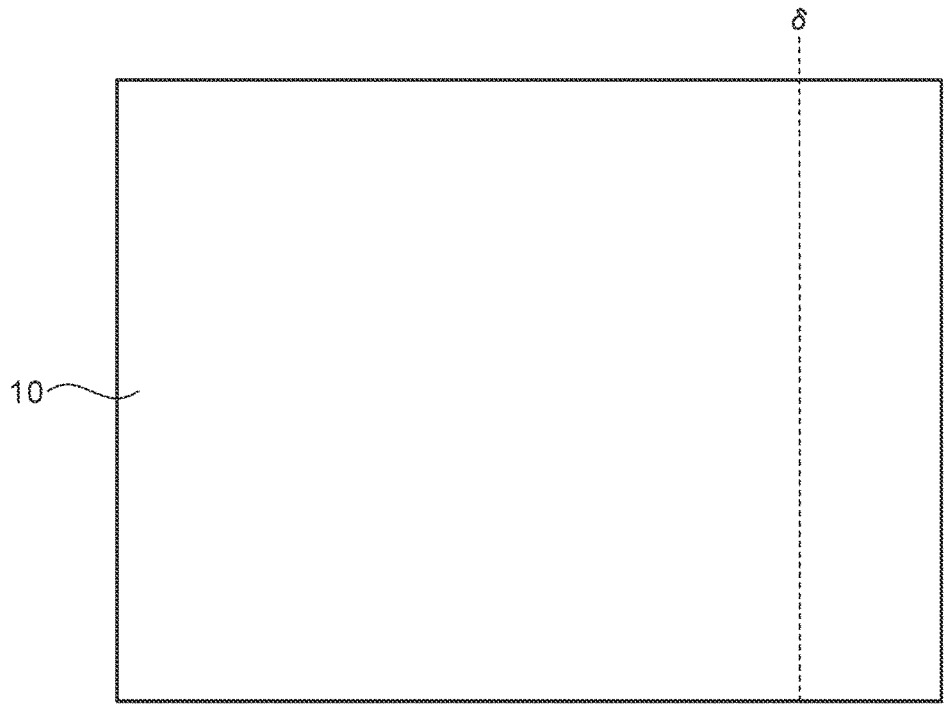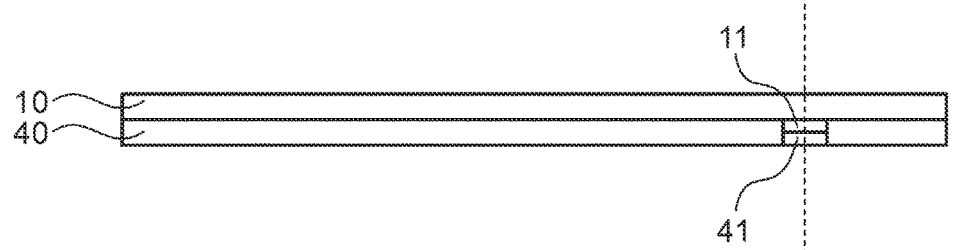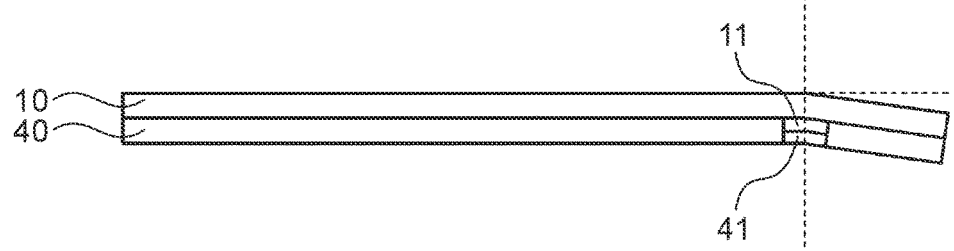
FIG. 3

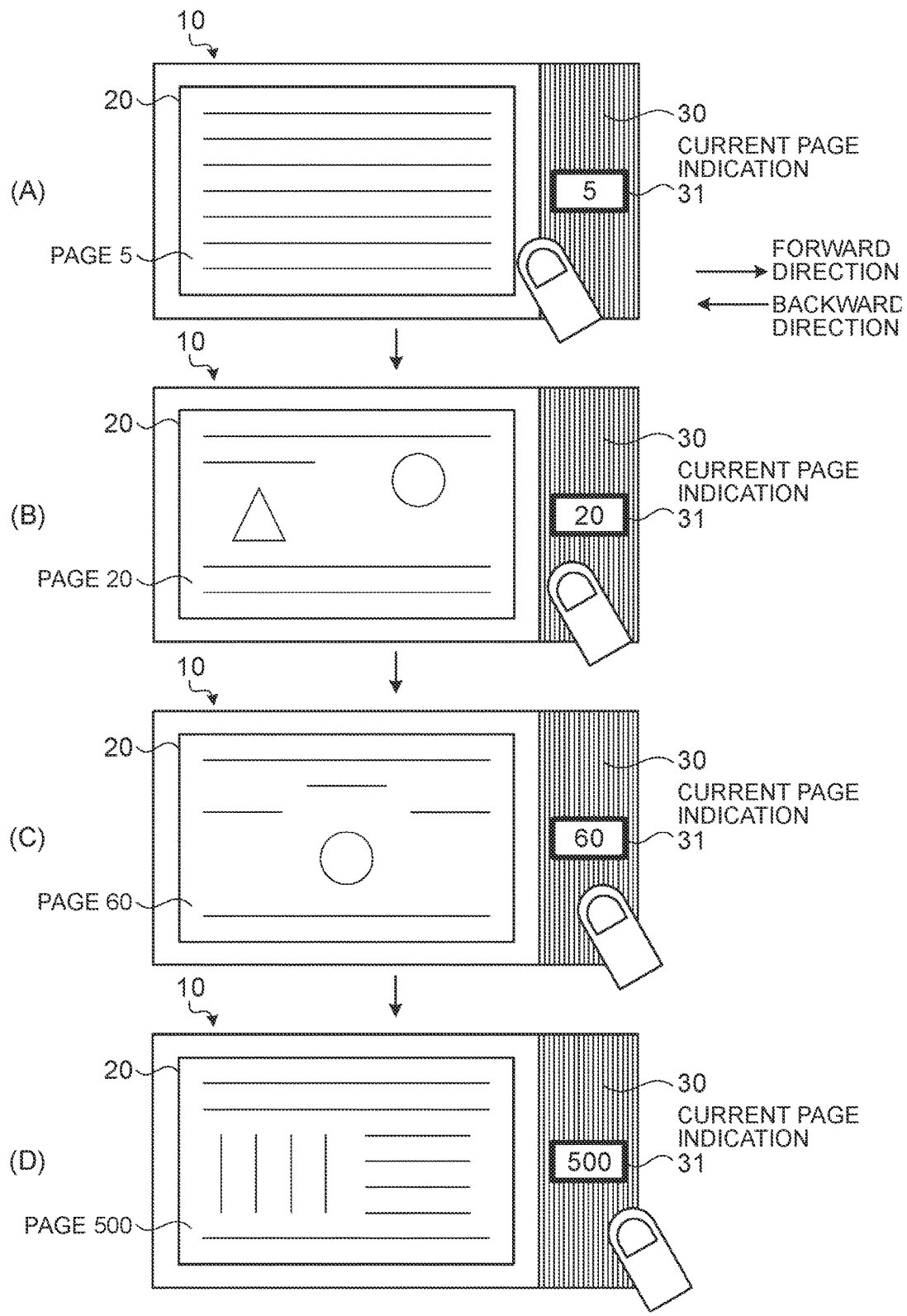
FIG. 5-A

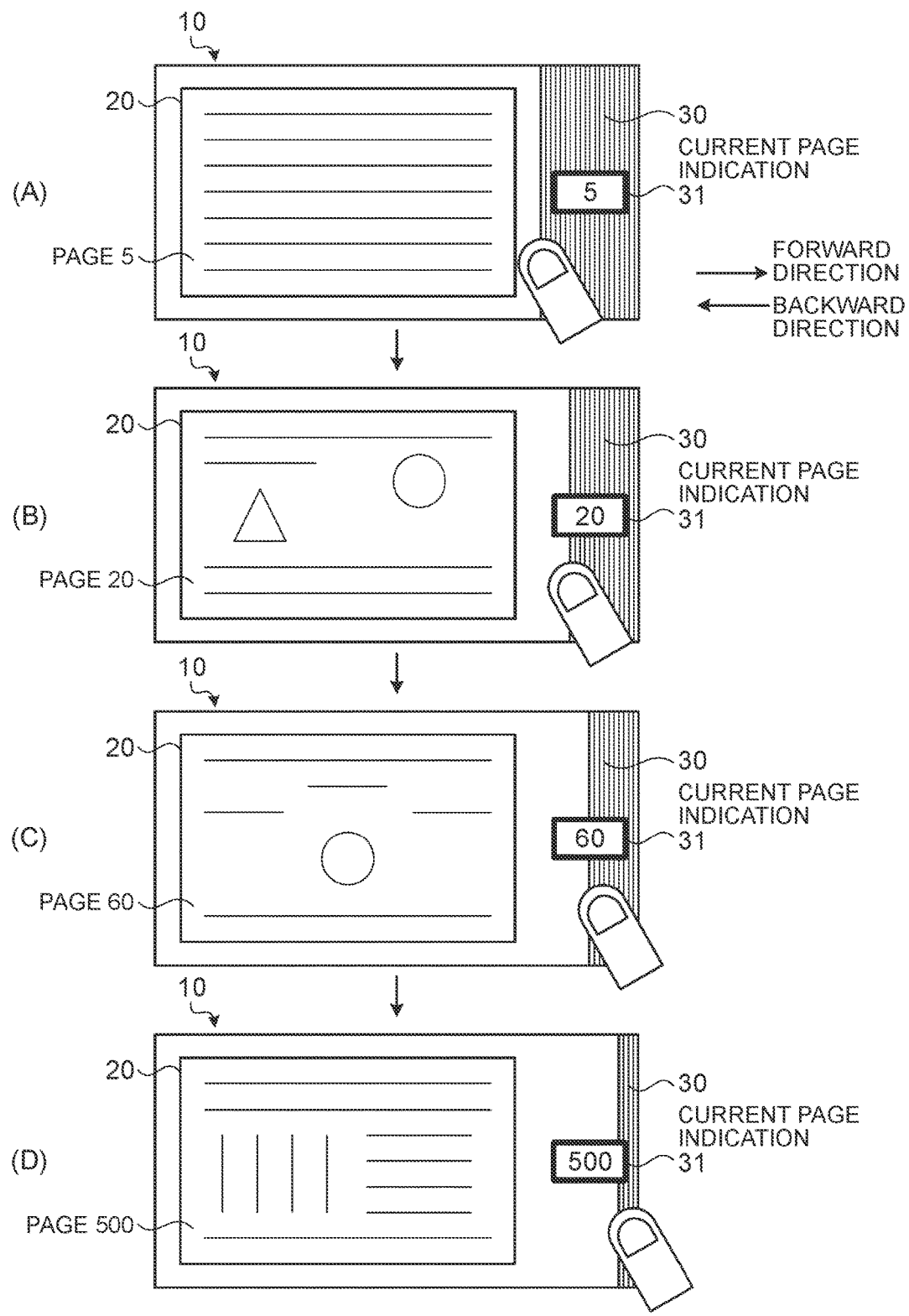
FIG. 5-B

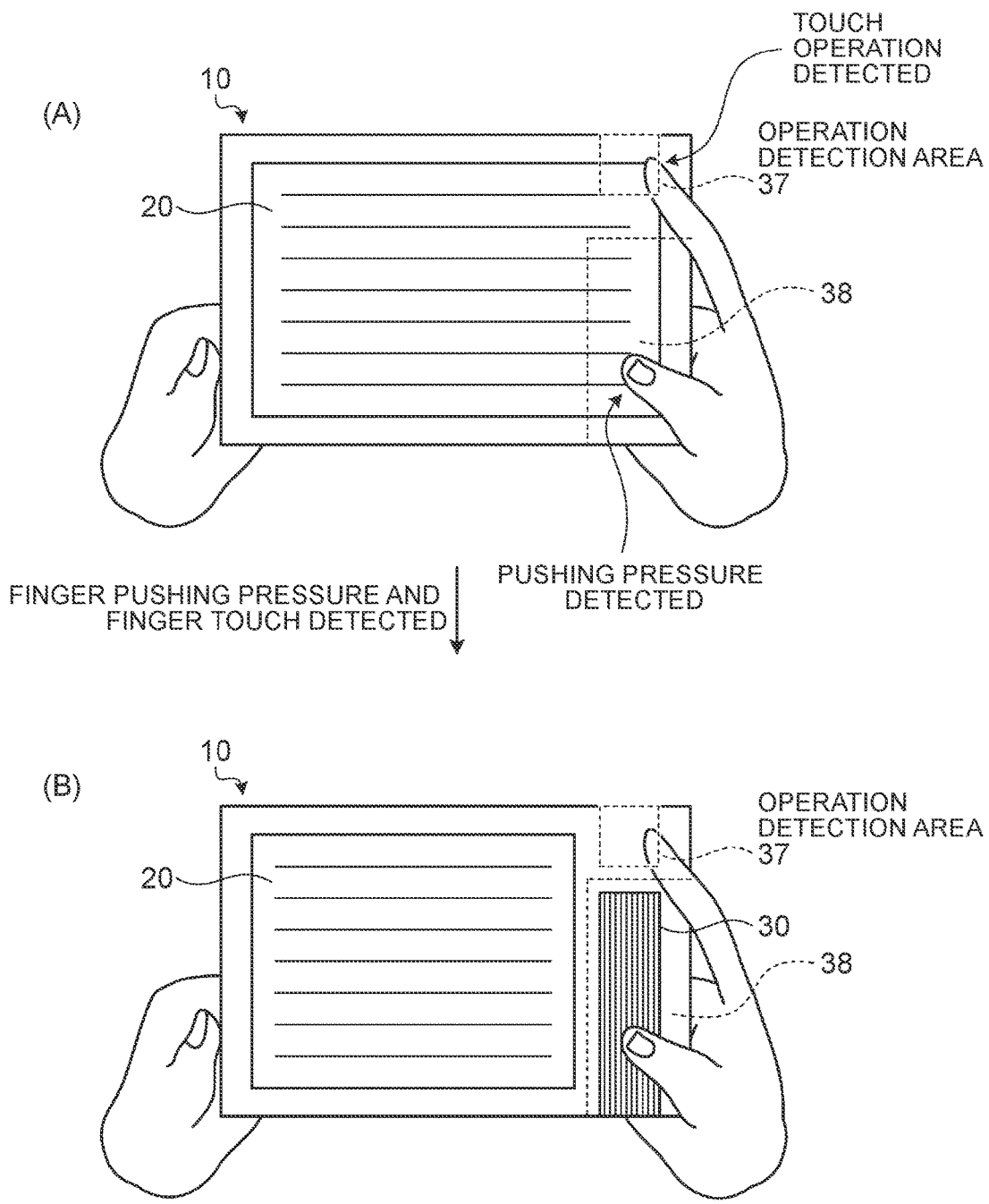
FIG. 7-A

DEVICE, METHOD AND COMPUTER PROGRAM PRODUCT FOR DISPLAY OF ELECTRONIC INFORMATION

CROSS-REFERENCE TO RELATED APPLICATIONS

This patent application claims priority to Japan Patent Application No. JP2016-45896 filed on 9 Mar. 2016 for Seita Horikoshi, the entire contents of which are incorporated herein by reference for all purposes.

FIELD

The subject matter disclosed herein relates to an information processing device, a display method, and a computer program product for the same.

BACKGROUND

In recent years, electronic books, which include electronic media in which characters, images, or other information is recorded to be used as if it were a paper medium book (hereinafter, simply referred to as "book"), have become popular. Electronic books are often read with a dedicated terminal device or an electronic book viewer installed in a multipurpose terminal device.

When reading a book, a person generally turns a page quickly by applying strong pressure to the desired side of the book, heavily warping the book, and turns a page more slowly by applying light pressure to the side of the book, slightly warping the book. However, in current electronic book terminal devices, the electronic book is configured in such that a finger is used to change the page of screen data displayed on a touch panel display section according to the sliding direction of the finger. Therefore, the feeling in such a situation is remarkably different from that of a person who turns a page of a book.

BRIEF SUMMARY

An apparatus, method and computer program product for display of electronic information are disclosed.

The apparatus includes: a touch panel display section that displays electronic information arranged in units of a page; a first detection section that detects a user's external force applied to the touch panel display section; and a display control section that performs page turning of the electronic info displayed on the touch panel display section based on a detection result of the first detection section.

The method includes: detecting a user's external force applied to a touch panel display section of an information processing device that displays electronic information arranged in units of a page; and performing page turning of the electronic information displayed on the touch panel display section based on a detection result of the user's external force.

The computer program product comprises a computer readable storage medium that stores code executable by a processor, the executable code comprising code to perform: detection of a user's external force applied to a touch panel display section of an information processing device that displays electronic information arranged in units of a page; and a page turning operation of the electronic information displayed on the touch panel display section based on a detection result of the user's external force.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a schematic diagram depicting one embodiment of the information processing device wherein the touch panel display section has a flexible structure.

FIG. 5-A is an explanatory diagram depicting processing of page turning by operating the page turning UI in one embodiment of the information processing device.

FIG. 5-B is a diagram illustrating another instance of the page turning UI in one embodiment of the information processing device.

FIG. 7-A is an explanatory diagram for describing a variation of FIG. 7.

DETAILED DESCRIPTION

Figure 1:
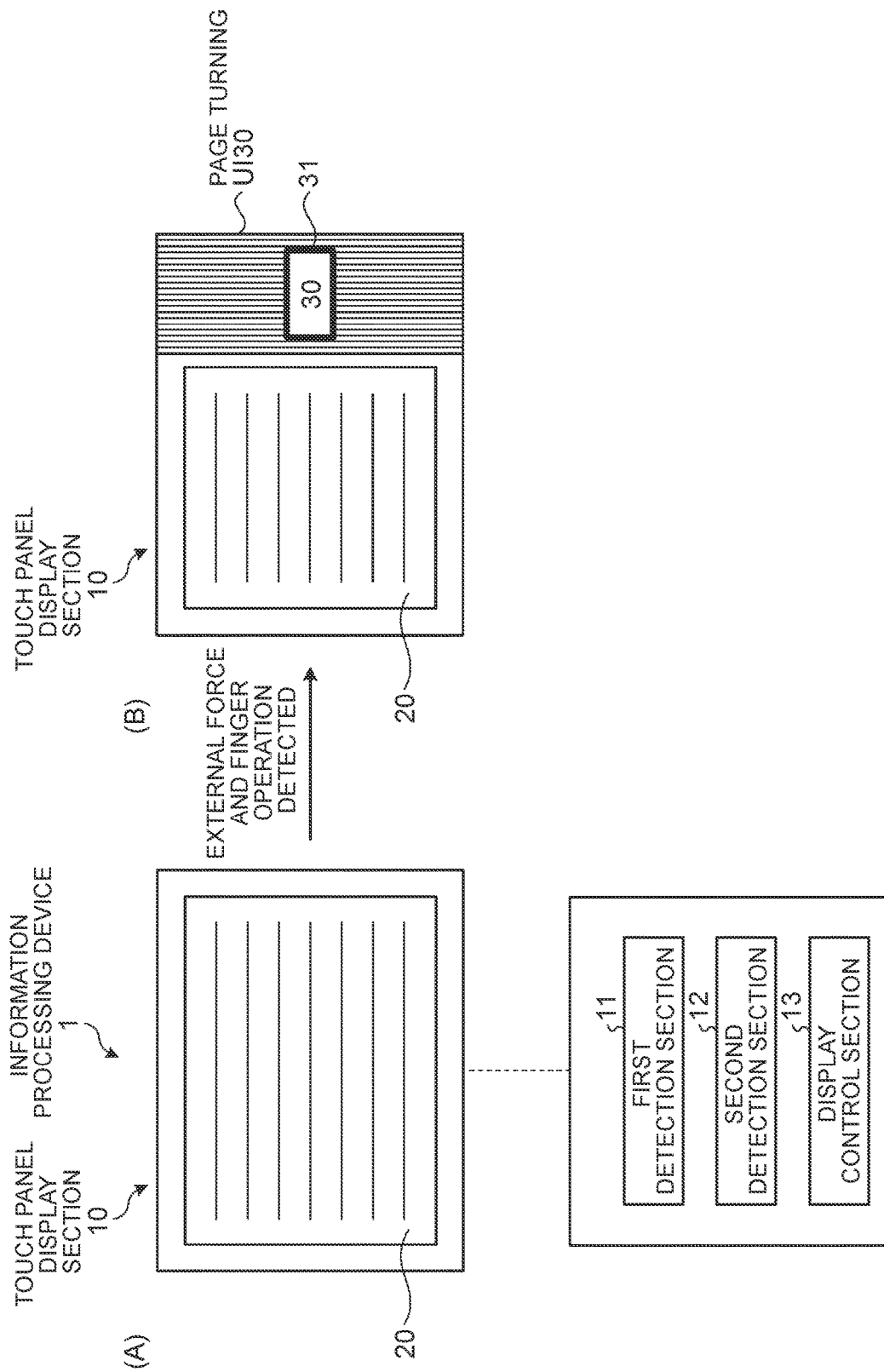
FIG. 1 is a conceptual diagram of one embodiment of an information processing device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a conceptual diagram of an information processing device. Depending upon the individual embodiment, the information processing device may comprise a smartphone, a tablet, a PC, a game terminal, a PDA, or other information processing device.

In FIG. 1, the information processing device 1 displays electronic information (such as an electronic book or the like) arranged in pages on a touch panel display section 10 and has a page turning function that includes both forward page turning and backward page turning.

The information processing device 1 includes a touch panel display section 10, a first detection section 11 that detects a user's external force applied to the touch panel display section 10, a second detection section 12 that detects a finger operation on the touch panel display section 10, and a display control section 13 that determines a page turning speed according to a detection result of the first detection section 11 and performs page turning of electronic information displayed on the touch panel display section 10 by updating the display of the electronic information at the determined page turning speed.

The first detection section 11, the second detection section, and the display control section 13 may be formed of modules of hardware, modules of software, such as an OS, an API, a service, a utility, a library, a driver, and an application or other programs, or a combination thereof. Moreover, a computer may implement the functions of the first detection section 11, the second detection section, and the display control section 13 by executing a program.

The touch panel display section 10 may be formed of a display unit and a touch panel superimposed on the display unit. In some embodiments, the display unit comprises an LCD or an organic EL display device. The touch panel may be a pressure-sensitive multi-touch panel capable of detecting a pressure and a plurality of touches. The touch panel detects the touch position of a finger and the pressure thereof and then outputs the touch position and the pressure to the second detection section 12. Moreover, the touch panel display section 10 may be provided with a frame therearound or may be frameless.

The first detection section 11 is configured to detect the magnitude of a warp or a bending angle of the touch panel display section 10 caused by a user's external force or bending operation on the touch panel display section 10. The warp or bending of the touch panel display section 10 may be detected by a strain sensor, an angle sensor, an acceleration sensor, or the like. The term "bending" as used herein includes bending of not only the front face, but also the rear face of the touch panel display section 10 along an axis. The term "warp" includes bending not along an axis.

Moreover, the first detection section 11 may be configured to detect the magnitude of finger pressure applied to a predetermined area of the touch panel display section 10 based upon the output of the touch panel display section 10.

The second detection section 12 is configured to detect a touch operation, a sliding operation (such as an operation of swiping or tracing the surface of the touch panel display section 10), and a finger pressure operation or the like as a finger operation on the touch panel display section 10, based on the detected output of the touch panel of the touch panel display section 10. In some embodiments, the touch panel may be configured to form a part of the second detection section 12.

The display control section 13 controls the operations of the touch panel and the display unit of the touch panel display section 10. The display control section 13 displays electronic information arranged in pages (e.g. an electronic book or the like) on the screen of the touch panel display section 10. The display control section 13 may also perform page turning processing of the electronic information displayed on the screen at a page turning speed corresponding to the magnitude of a user's external force detected by the first detection section 11 or corresponding to a bending operation of the touch panel display section 10.

Alternatively, the display control section 13 may perform the page turning of the electronic information displayed on the touch panel display section 10 based on a combination of a detection result of the first detection section 11 and a detection result of the second detection section 12. For example, in some embodiments the display control section 13 determines the page turning speed based on the user's external force detected by the first detection section 11 and a finger operation detected by the second detection section 12. The "page turning speed" is a frequency at which the display of electronic information is changed in units of a page per unit time.

The display control section 13 may also set the page turning speed to a higher frequency as the magnitude of the user's external force or the angle detected by the first detection section 11 increase.

In some embodiments, the display control section 13 displays a page turning UI 30 on the touch panel display section 10 after the first detection section 11 has detected the user's bending force and the second detection section has detected a touch on the touch panel display section 10. In this case, the second detection section 12 may detect a sliding operation on the page turning UI, and the display control section 13 may perform the page turning of the electronic information in response to the sliding operation on the page turning UI. Moreover, in some embodiments, the page turning UI is configured to include an indicator showing the current page and the last page of the electronic information.

In the instance illustrated in FIG. 1, as illustrated in FIG. 1(A), the display control section 13 displays a predetermined page (in this example, page 30) of the electronic information 20 on the touch panel display section 10. If the second detection section 12 detects a finger operation and the first detection section 11 detects a user's external force applied to the touch panel display section 10, the display area of the electronic information 20 is reduced and the touch panel display section displays a page turning UI 30 as illustrated in FIG. 1(B). The page turning UI 30 includes the indication 31 of the current page 30 of the electronic information 20. A user may then perform the page turning function of the electronic information 20 by performing a sliding operation on the page turning UI 30 with his/her finger.

Figure 2:
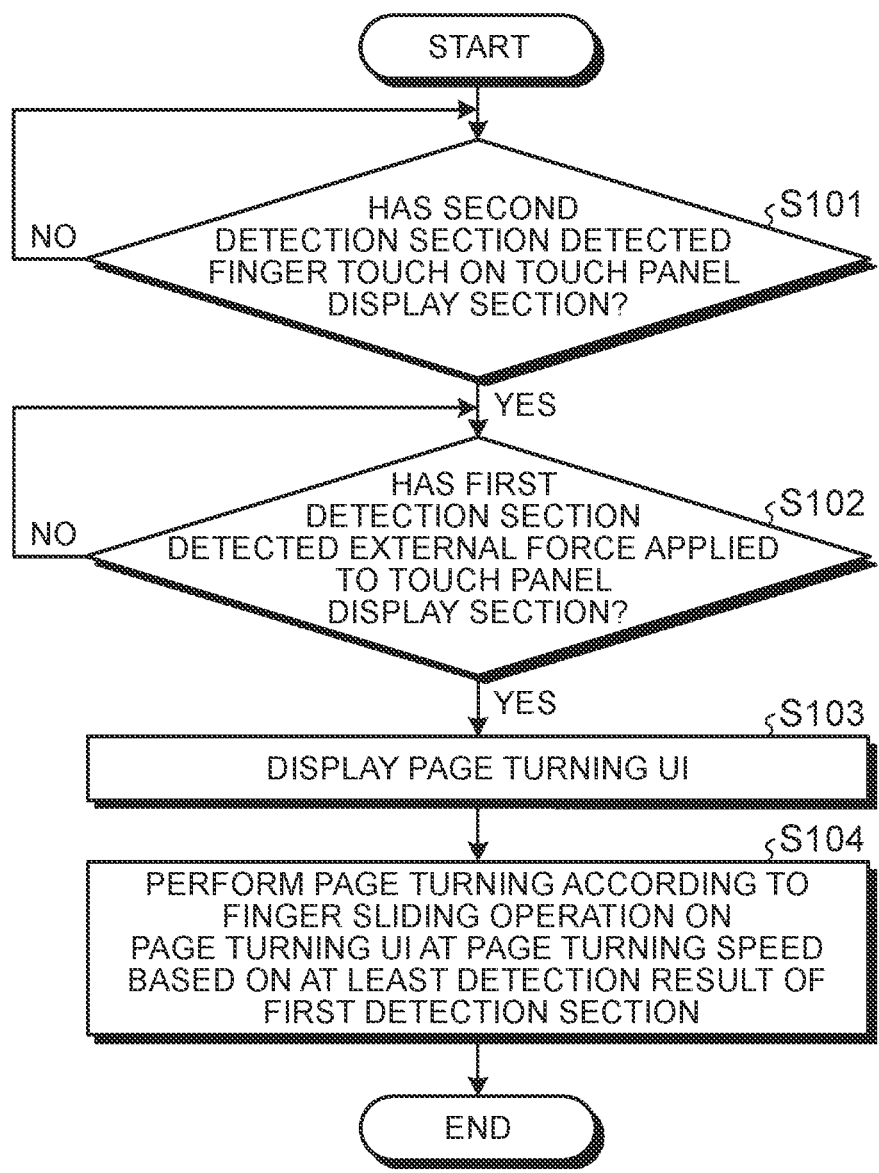
FIG. 2 is a flowchart for describing page turning processing of one embodiment of the information processing device.

FIG. 2 is a flowchart for describing one embodiment of page turning processing of the information processing device. In FIG. 2, if the second detection section 12 detects a touch on the touch panel display section 10 ("Yes" in step S101) and the first detection section 11 detects a user's external force applied to the touch panel display section 10 ("Yes" in step S102), the display control section 13 displays the page turning UI 30 on the touch panel display section 10 (step S103). In some embodiments, the display control section 13 may display the page turning UI 30 on the touch panel display section 10 on the condition that the first detection section 11 detects a user's external force exceeding a first threshold value.

In some embodiments, the first detection section 11 may be configured to detect a user's external force applied to a predetermined area of the touch panel display section 10. For example, the first detection section 11 may be configured to detect a user's external force applied to an area having a predetermined width on either side of the screen of the touch panel display section 10.

The display control section 13 performs page turning of the electronic information at a page turning speed based on at least include the user's external force detected by the first detection section 11 (step S104), if not more factors. For example, to provide a plurality of settings for the page turning speed, the display control section 13 may be configured to perform page turning processing at a relatively low page turning speed until a user's external force exceeds a second threshold value and to perform page turning processing at a relatively high page turning speed after the user's external force exceeds the second threshold value and before it exceeds a third threshold value. Three or more settings may be provided as the settings of the page turning speed. The second threshold value and the third threshold value may be set to values either greater or smaller than the first threshold value.

The display control section 13 may also be configured to start the page turning processing in step S104 on a condition that the second detection section 12 detects an operation of giving an instruction of starting page turning processing. For example, the display control section 13 may be configured to start the page turning processing on the condition that the second detection section 12 detects a finger sliding operation on the page turning UI 30. Imposing a condition in this manner prevents erroneous operation. In addition, in some embodiments, the display control section 13 performs page turning in the forward direction if the second detection section 12 detects a rightward sliding operation on the page turning UI 30, and performs page turning in the backward direction if the second detection section 12 detects a leftward sliding operation on the page turning UI 30. Furthermore, the display control section 13 may terminate the display of the page turning UI 30 if a user releases the finger from the touch panel display section 10 or the user's external force is lost.

Although the page turning UI 30 is displayed at the right side of the touch panel display section 11 in FIG. 1, the embodiments are not limited to such a configuration. The page turning UI 30 may be displayed at the left end or on both the right end and the left end of the touch panel display section 11. For example, if a spread display (e.g. a two-page display) is performed, the page turning UI 30 may be displayed on the right side and the left side, so that the page turning operation may be performed in either of the page turning UIs 30. In this case, page turning may be performed at a page turning speed based on a user's external force applied to the page turning UI 30 at the right end with respect to the right page, and page turning may be performed at a page turning speed based on a user's external force applied to the page turning UI 30 at the left end with respect to the left page.

The following, which refers to FIGS. 3 through 6, describes page turning some embodiments wherein the touch panel display section 10 is configured to have a flexible structure so that it can be warped or bent.

FIG. 3 is a schematic diagram for one embodiment wherein a touch panel display section 10 has a flexible structure. FIG. 3(A) is a top view of the information processing device 1. FIG. 3(B) is a side view of the information processing device 1 in a state where the information processing device 1 is not warped or bent. FIG. 3(C) is the same side view of the information processing device 1, but the information processing device 1 is in a warped or bent state.

As illustrated in FIG. 3(A), the touch panel display section 10 has a flexible structure and is configured to be able to be warped or bent around at least one axis δ. As illustrated in FIG. 3(B), there is provided a flexion portion 41, which is formed so that a chassis 40 can be warped or bent around the axis δ in a part (in this case, the right end) of the chassis 40 supporting the touch panel display section 10. A strain sensor, an angle sensor, an acceleration sensor, or the like is provided as the first detection section 11 between the flexion portion 41 and the touch panel display section 10. As illustrated in FIG. 3(B), if the touch panel display section 10 is warped or bent along the axis δ, the strain amount, pressure, angle, or other appropriate change in state detected by the first detection section 11 increases, thereby enabling the warp or bending of the touch panel display section 10 to be detected.

Figure 4:
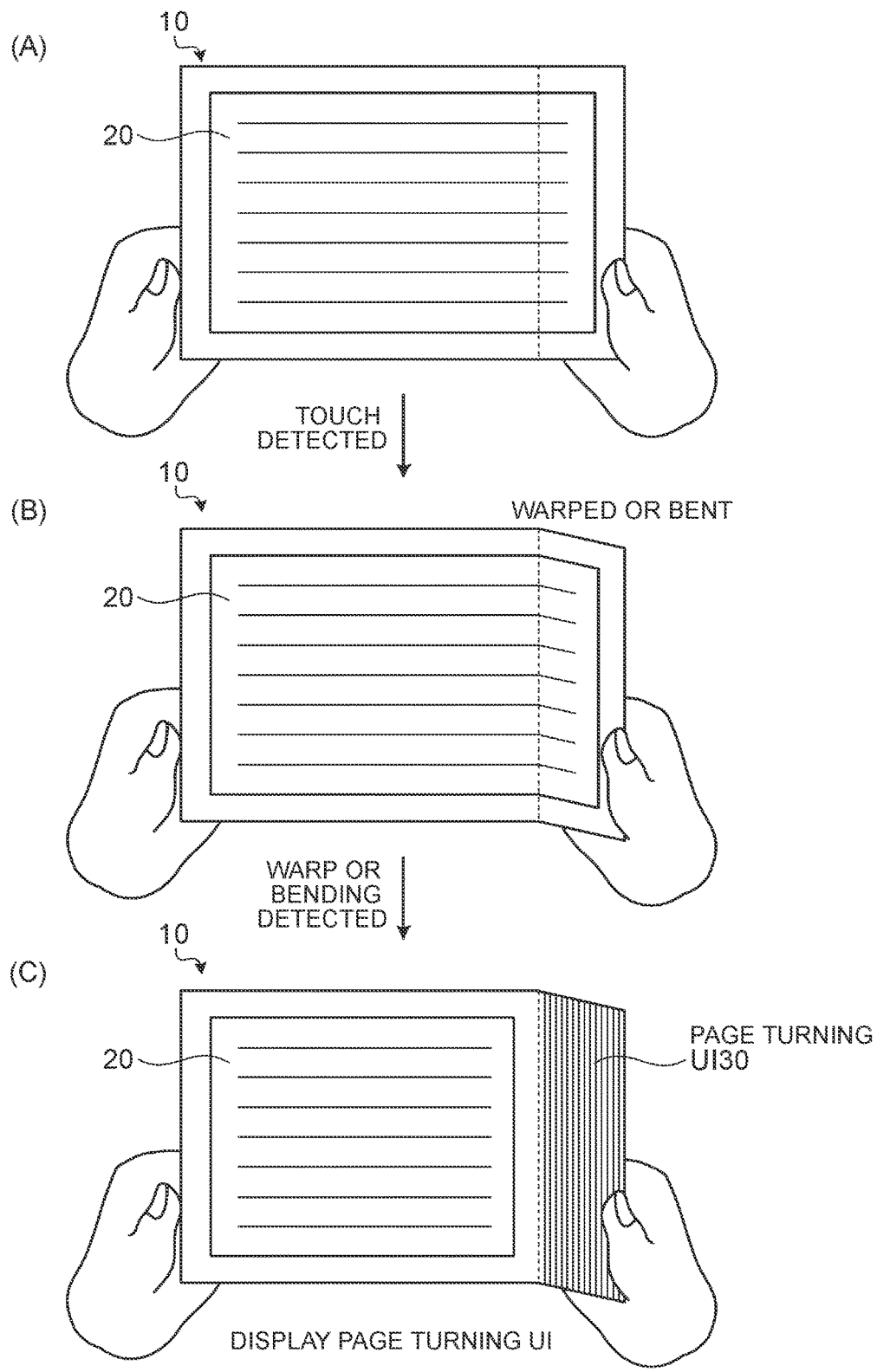
FIG. 4 is an explanatory diagram for describing processing performed before displaying a page turning UI in one embodiment of the information processing device.

FIGS. 4 and 5 are explanatory diagrams for describing page turning in the deformation of the touch panel display section 10 as illustrated in FIG. 3 described above. FIG. 4 is a diagram for describing processing performed before displaying the page turning UI 30. FIG. 5-A is a diagram for describing processing of performing page turning by operating the page turning UI 30. Although the touch panel display section 10 is illustrated in a planar manner in FIG. 5-A, it is in a state after the processing of FIG. 4 and therefore the touch panel display section 10 is warped or bent in the state of FIG. 5-A.

If a user touches the touch panel display section 10 with a finger in FIG. 4(A), the second detection section 12 detects the finger touch. Subsequently, if the user warps or bends the touch panel display section 10 as illustrated in FIG. 4(B), the first detection section 11 detects the warp or bending of the touch panel display section 10. In response, the display control section 13 displays the page turning UI 30 on the touch panel display section 10 as illustrated in FIG. 4(C).

In some embodiments, the display control section 13 performs page turning of electronic information at a page turning speed corresponding to the warp amount (or the magnitude of pressure) or to the bending amount or angle of the touch panel display section 10 detected by the first detection section 11. In other embodiments, the display control section 13 may perform page turning of electronic information at a page turning speed corresponding to both the warp amount value (or the magnitude of pressure) and the bending amount (bending angle).

As described above, the display control section 13 may be configured to start page turning processing on the condition that the second detection section 12 detects an operation corresponding to an instruction to start page turning processing such as a sliding operation. Imposing a condition in this manner prevents erroneous operation. The display control section 13 sets the page turning speed to a low level if the warp amount or the bending amount of the touch panel display section 10 is small and sets the page turning speed to a high level if the warp amount or the bending amount of the touch panel display section 10 is large. A user may decrease the warp amount or the bending amount of the touch panel display section 10 if she wants to turn the page slowly and may increase the warp amount or the bending amount of the touch panel display section 10 if she wants to turn the page quickly.

This user operation is analogous to the operation of a user who reads a book in that the user heavily warps the book if he wants to turn the pages quickly or slightly warps the book if he wants to turn the page slowly. Thus, the user can perform page turning of electronic information with a similar feeling to that of page turning in a book.

In FIG. 5-A, the display control section 13 performs page turning in the forward direction if the second detection section 12 detects a rightward sliding operation on the page turning UI 30, and performs page turning in the backward direction if the second detection section 12 detects a leftward sliding operation on the page turning UI 30. If a user performs a sliding operation on the page turning UI 30 as illustrated in (A) to (D) of FIG. 5-A, the page turning of the electronic information 20 is performed sequentially and the current page indication 31 of the page turning UI 30 is correspondingly updated.

In some embodiments, the page turning speed may be changed in response to the pushing pressure of a finger used to perform the sliding operation on the page turning UI 30 in addition to the warp amount or the bending amount of the touch panel display section 10. For example, the page turning speed may be increased if the pushing pressure of a finger used to perform the sliding operation is high, and the page turning speed may be decreased if the pushing pressure of a finger used to perform the sliding operation is low. Other embodiments utilize the pushing pressure in lieu of the warp amount or the bending amount to change the page turning speed.

Although the page turning UI 30 is displayed on the right side of the touch panel display section 11, and the mechanism for detecting the warp or bending of the touch panel display section 11 is found on the right side of the touch panel display section 11, as shown in FIGS. 3 to 5-A, the embodiments are not limited thereto. The page turning UI 30 may be displayed at the left end or at both the right and left ends with the touch panel display section 11 configured to be able to be warped or bent at either the left end or the right end, or at both the right and left ends.

For example, if a spread display (for example, a two-page display) is shown, the page turning UI 30 may be displayed at the right and left ends, so that page turning of the right side page is performed by the sliding operation on the page turning UI 30 at the right end, and is performed at a page turning speed based on the warp or bending amount of the right end and page turning of the left side page is performed by performing the sliding operation on the page turning UI 30 at the left end, and is performed at a page turning speed based on the warp or bending amount of the left end with respect to the left page.

FIGS. 5-B and 6 are diagrams illustrating other instances of the page turning UI 30. As illustrated in (A) to (D) of FIG. 5-B, for example, the page turning UI 30 may be displayed with a display width corresponding to the number of remaining pages of the electronic information 20. The display width of the page turning UI 30 may be reduced as the number of remaining pages decreases.

Figure 6:
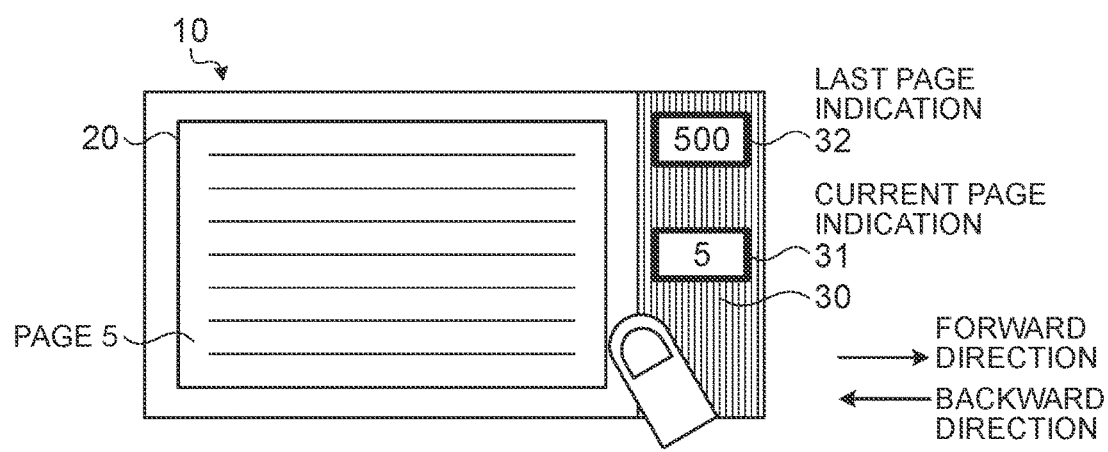
FIG. 6 is a diagram illustrating yet another instance of the page turning UI in one embodiment of the information processing device.

Moreover, as illustrated in FIG. 6, the indication 32 of the last page may be displayed on the page turning UI 30, as well as the indication 31 of the current page.

In some embodiments, the display control section 13 is configured to perform page turning based on a direction of the sliding operation of a finger on the touch panel display section 10 without displaying the page turning UI 30. Moreover, a touch operation may be employed instead of the sliding operation. For example, the display control section 13 may be configured to perform page turning in the forward direction if the left side of the screen is touched and to perform page turning in the backward direction if the right side of the screen is touched.

Furthermore, the embodiments may be configured in such a way that a user can select whether the page turning UI 30 is to be displayed using a setting screen not illustrated. In some embodiments, the user may configure the device to turn pages of the electronic information displayed on the screen by performing a sliding operation or may turn pages by using the page turning UI 30.

Figure 7:
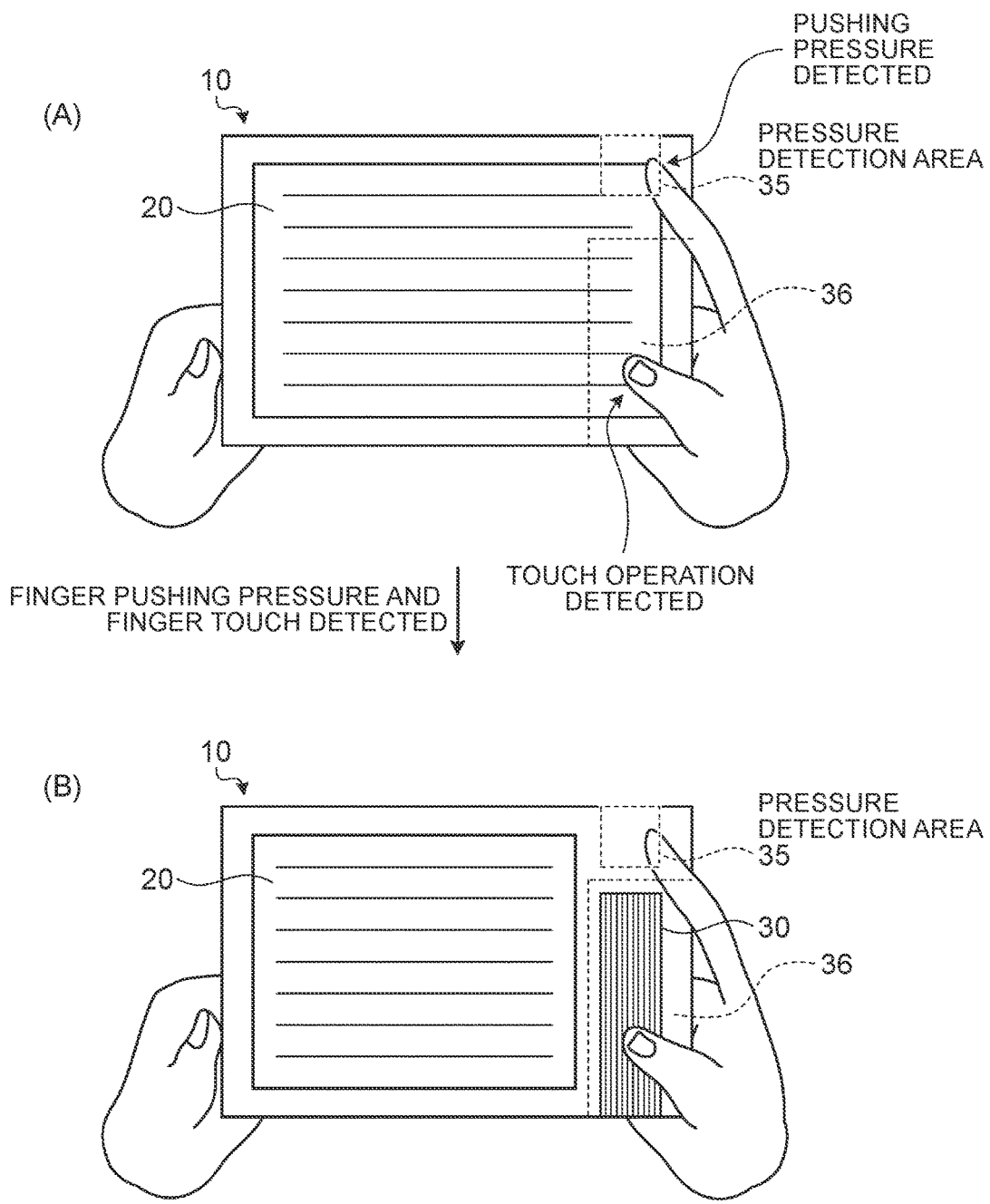
FIG. 7 is an explanatory diagram depicting one embodiment of the information processing device wherein the touch panel display section has a rigid structure.

FIG. 7 is an explanatory diagram for describing another embodiment that includes the touch panel display section 10. In some embodiments, the touch panel display section 10 may have a rigid structure. In FIG. 7, the touch panel display section 10 has a rigid structure comprising, for example, a glass substrate or the like. The first detection section 11 may detect a pushing pressure of a finger on a predetermined area of the touch panel display section 10 as a user's external force applied to the touch panel display section 10.

In FIG. 7(A), the touch panel display section 10 is provided with a pressure detection area 35 in the upper right thereof. The first detection section 11 detects a pushing pressure of a finger on the pressure detection area 35 as a user's external force. The second detection section 12 detects a touch operation in the right end area 36 of the touch panel display section 10. A user touches the right end area 36 of the touch panel display section 10 with a finger (for example, a thumb) and pushes the pressure detection area 35 of the touch panel display section 10 with a finger (for example, an index finger). In response thereto, as illustrated in FIG. 7(B), the display control section 13 displays the page turning UI 30. The display control section 13 may be configured to display the page turning UI 30 on condition that either one of the touch operation in the right end area 36 of the touch panel display section 10 and the finger pushing pressure applied to the pressure detection area 35 of the touch panel display section 10 is detected.

FIG. 7-A is a diagram for describing a variation of FIG. 7. In FIG. 7-A(A), the touch panel display section 10 is provided with an operation detection area 37 in the upper right. The second detection section 12 detects a touch operation in the operation detection area 37. The first detection section 11 detects a pushing pressure of a finger on the right end area 38 of the touch panel display section 10 as a user's external force. A user touches the operation detection area 37 of the touch panel display section 10 with a finger (for example, the index finger) and pushes the right end area 38 of the touch panel display section 10 with a finger (for example, the thumb). In response, the display control section 13 displays the page turning UI 30 as illustrated in FIG. 7-A(B). The display control section 13 may display the page turning UI 30 on the condition that either one of the touch operation in the operation detection area 37 and the pushing pressure of a finger on the right end area 38 of the touch panel display section 10 is detected.

The display control section 13 performs page turning in response to the sliding operation of a finger on the page turning UI 30 detected by the second detection section 12 at a page turning speed corresponding to the pushing pressure detected by the first detection section 11. The display control section 13 sets the page turning speed to a low level if the pushing pressure detected by the first detection section 11 is low and sets the page turning speed to a high level if the pushing pressure is high.

This user operation is also similar to the operation of a user who reads a book such that the user turns a page by applying strong pressure to the side of the page of the book if he/she wants to turn the page quickly or turns a page by applying light pressure to the side of the page of the book if he/she wants to turn the page slowly. Thus, the user can perform page turning of electronic information with a similar feeling to that of reading a book.

Figure 8:
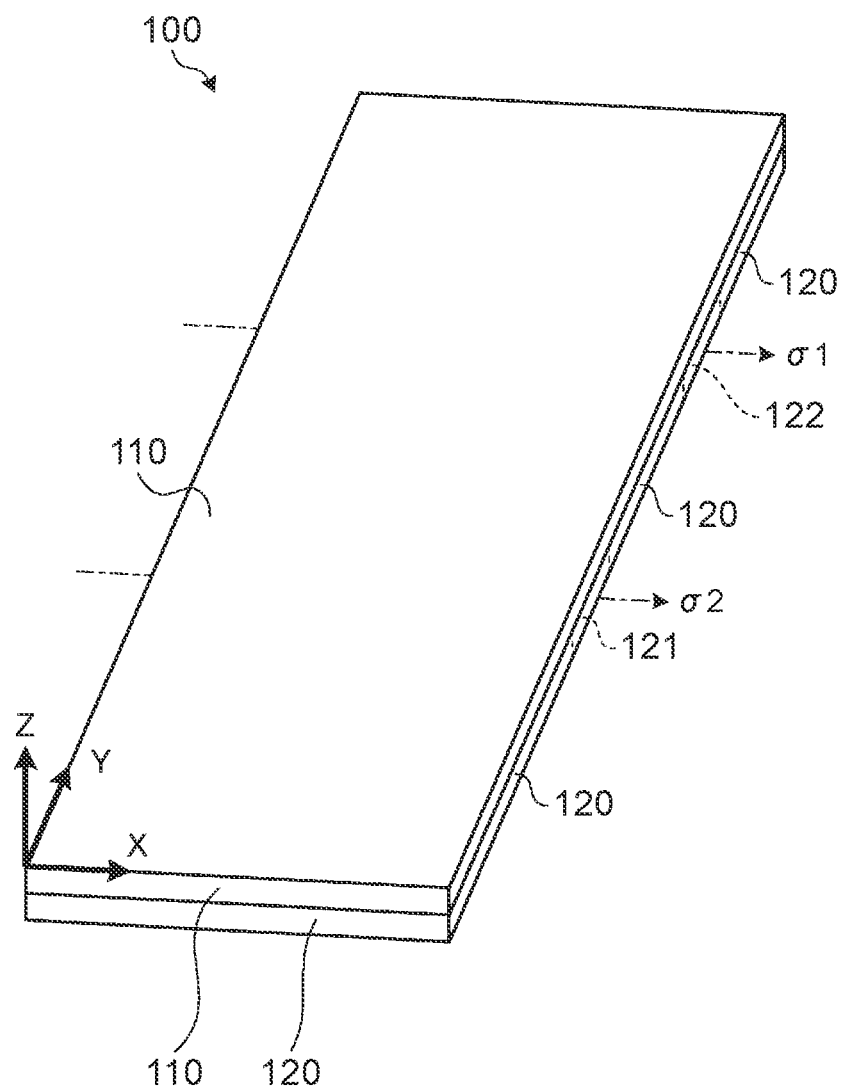
FIG. 8 is a schematic perspective view illustrating a flat state of one embodiment of the information processing device.
Figure 9:
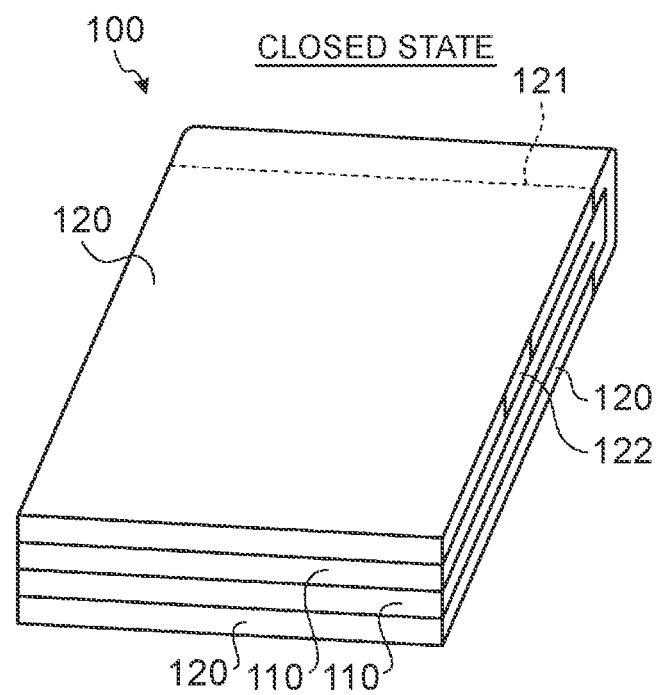
FIG. 9 is a schematic perspective view illustrating a closed or folded state of one embodiment of the information processing device.

The following describes an example wherein one embodiment of the information processing device is applied to a foldable or bendable tablet. FIG. 8 is a schematic perspective view illustrating one configuration of the information processing device while in a flat state. FIG. 9 is a diagram illustrating the information processing device in a closed state.

As illustrated in FIG. 8, the information processing device 100 includes a chassis 120. The chassis 120 is configured to be bendable at a plurality of places (such as axis σ1, axis σ2) and includes a flexion portion 121 for a configuration where the chassis 120 is bendable or rotatable around the axis σ2 substantially through 360 degrees, provided substantially in the central position. The chassis also includes a flexion portion 122 for a configuration where the chassis 120 is bendable or rotatable around the axis σ1 substantially through 360 degrees. The flexion portions 121 and 122 may have a known structure. For example, a single- or multi-axis hinge mechanism, an elastic material or the like can be used.

In the chassis 120, there is arranged a touch panel display unit 110 including a display unit and a touch panel arranged on the display unit. The touch panel display unit 110 is formed of bendable flexible material, and therefore if the chassis 120 is bent, the touch panel display unit 110 is also bent.

FIG. 9 illustrates a state where the information processing device 100 illustrated in FIG. 8 is folded by bending the information processing device 100 by approximately 180 degrees around the axis σ2.

Figure 10:
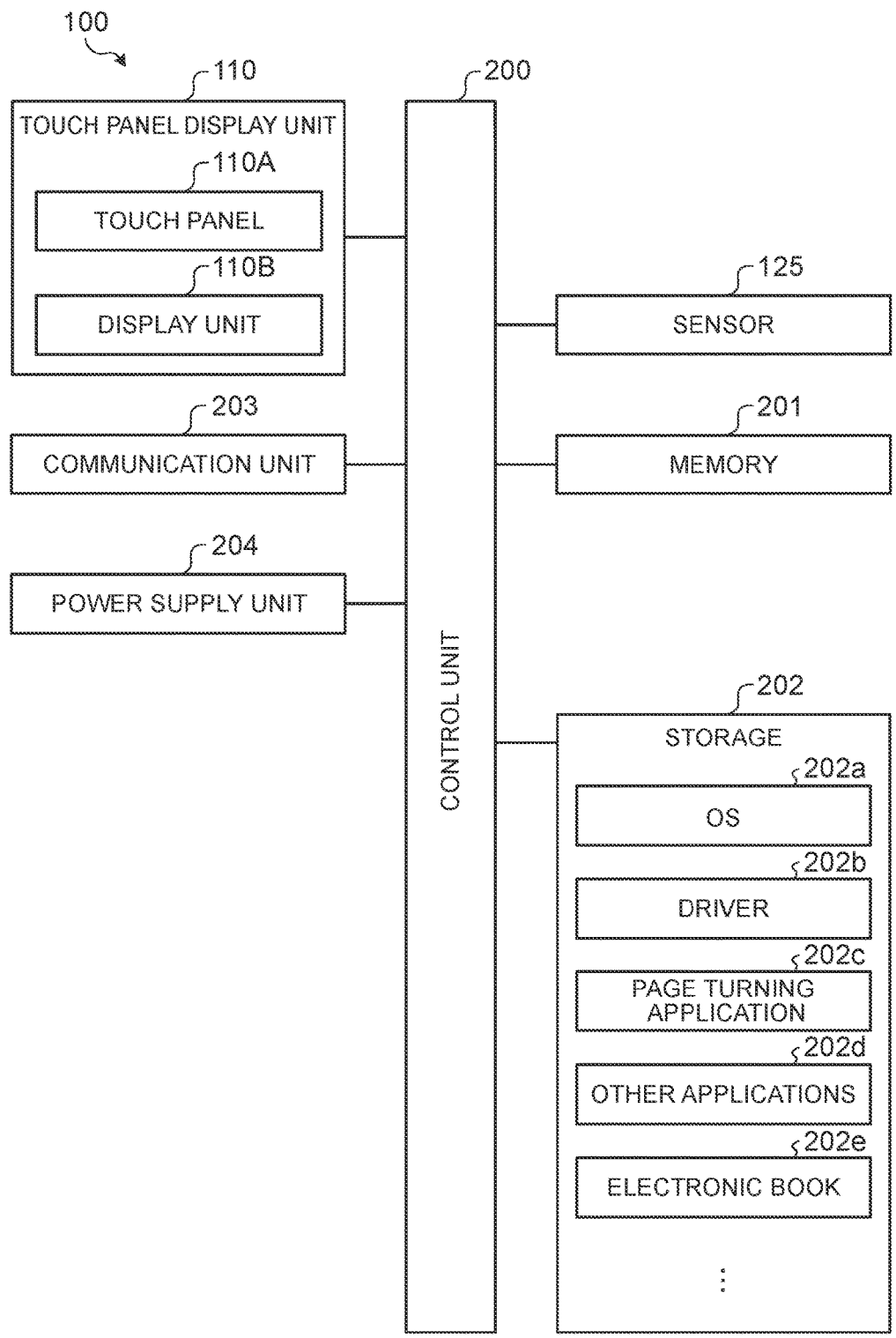
FIG. 10 is a diagram illustrating a rough hardware configuration of one embodiment of the information processing device.

FIG. 10 is a diagram illustrating a hardware configuration instance of one embodiment of the information processing device 100. As illustrated in FIG. 10, the information processing device 100 includes a touch panel display unit 110 (itself comprising a display unit 110B and a touch panel 110A), a control unit 200, a memory 201, a sensor 125, a communication unit 203, and a power supply unit 204.

The touch panel display unit 110 has a display unit 110B and a touch panel 110A superimposed on the display unit 110B. The touch panel 110A, which comprises, in some embodiments, a pressure-sensitive multi-touch panel, detects the finger touch coordinates and a finger pressure and then notifies the control unit 200 thereof. The control unit 200 detects touch operations, sliding (swiping) operations, pitch operations, and the like based on a detection output from the touch panel 110A. The display unit 110B, which comprises, in some embodiments, a liquid crystal display (LCD) or an organic electro-luminescence (organic EL) panel, displays characters and graphics or the like according to the control of the control unit 200.

The communication unit 203 is a device for performing a wired or wireless data communication to other devices under the control of the control unit 200. The power supply unit 204 supplies electric power, obtained from a rechargeable battery or an AC adapter, to respective units of the information processing device 100 including the control unit 200 under the control of the control unit 200.

The sensor 125 is a sensor for use in detecting the bending amount of the touch panel display unit 110 (the chassis 120) around the axis σ1 and is, for example, a strain sensor, an angle sensor, an acceleration sensor, or the like. The sensor 125 notifies the control unit 200 of its detection result, and the control unit 200 detects the bending amount of the touch panel display unit 110 based on the detection result of the sensor 125.

The memory 201 comprises, in some embodiments, a RAM, a DRAM, or the like. The memory 201 is used as a work area where a program executed by the control unit 200, data referenced by the control unit 200, an arithmetic result of the control unit 200, and the like are temporarily stored.

The storage 202 is a computer-readable storage medium for storing a program executed by the control unit 200 or data, and the storage 202 comprises, in some embodiments, a nonvolatile memory such as an EEPROM, an SSD, a hard disk, or the like. The storage 202 has a function of storing, for example, an OS 202a for use in controlling the entire information processing device 100, various types of drivers 202b for use in performing hardware operations of peripheral equipment, a page turning application 202c, other applications 202d such as e-mail applications, browser applications, and text creation applications, and an electronic book 202e and the like. The OS 202a intervenes in data transfer between various drivers and applications.

The control unit 200, comprises, in some embodiments, a central processing unit (CPU), a microprocessor, a DSP, or the like, and it controls the operations of the information processing device 100 to implement various functions. Specifically, the control unit 200 executes instructions included in a program stored in the storage 202 while referring to data stored in the storage 202 or data expanded in the memory 201, if necessary, to implement various functions such as display functions, input functions, e-mail functions, and browsing functions.

The page turning application 202c, which is an electronic book viewer, displays electronic information corresponding to the electronic book 202e stored in the storage 202 on the touch panel display unit 110. In addition, the page turning application 202c enables page turning of electronic information displayed on the touch panel display unit 110. The control unit 200 executes the page turning application 202c, thereby enabling the implementation of the functions of the first detection section 11, the second detection section 12, and the display control section 13 illustrated in FIG. 1 described above.

The following designations are used in the accompanying figures:

1 information processing device
10 touch panel display section
11 first detection section
12 second detection section
13 display control section
20 electronic information
30 page turning UI
40 chassis
41 flexion portion
100 information processing device (tablet)
110 touch panel display unit
110A touch panel
110B display unit
120 chassis
121, 122 flexion portion
200 control unit
201 memory
202 storage
202c page turning application
203 communication unit
204 power supply unit Embodiments may be practiced in other specific forms. The described embodiments are to be considered in all respects only as illustrative and not restrictive. The scope of the embodiments is, therefore, indicated by the appended claims rather than by the foregoing description. All changes which come within the meaning and range of equivalency of the claims are to be embraced within their scope.

What is claimed is:

1. An apparatus, comprising:
a touch panel display section that displays electronic information of a digital book arranged in units of a digital page;
a first detection section of the touch panel display section that detects an external force applied, by a user, around and along an axis (δ) that extends between a top portion and a bottom portion of the touch panel display section;
a second detection section that detects a finger operation on the touch panel display section; and
a display control section that performs digital page turning operations on the electronic information displayed on the touch panel display section to turn one or more digital pages of the digital book,
wherein:
the display control section performs the digital page turning operations of the electronic information displayed on the touch panel display section based on a combination of the detection result of the first detection section and a detection result of the second detection section,
the touch panel display section is configured to warp analogous to a physical book to imitate the user turning one or more physical pages of the physical book in response to the external force being applied to the touch panel display,
the display control section performs the digital page turning operations in response to detecting the external force by the first detection section, and
the display control section performs the digital page turning operations at a page turning speed based on an amount the touch panel display warps in response to the external force being applied to the touch panel display section.

2. The apparatus of claim 1, wherein:
the display control section performs the digital page turning operations of the electronic information displayed on the touch panel display section at the page turning speed based further on the finger operation detected by the second detection section.

3. The apparatus of claim 1, wherein:
the display control section sets the page turning speed to a level proportional to a magnitude of the external force detected by the first detection section.

4. The apparatus of claim 1, wherein:
the display control section displays a page turning user interface (UI) used to perform the digital page turning operations on the touch panel display section;
the second detection section detects a finger operation on the page turning UI; and
the display control section performs the digital page turning operations of the electronic information displayed on the touch panel display section, at the page turning speed, based further on the finger operation on the page turning UI detected by the second detection section.

5. The apparatus of claim 4, wherein:
the display control section displays the page turning UI in response to the second detection section detecting a finger touch on the touch panel display section and the first detection section detecting the external force applied to the touch panel display section.

6. The apparatus of claim 4, wherein:
the page turning UI includes an indication of the current page of the electronic information displayed on the touch panel display section.

7. The apparatus of claim 6, wherein:
the page turning UI further includes an indication of the last digital page of the electronic information displayed on the touch panel display section.

8. The apparatus of claim 1, wherein:
the external force applied to the touch panel display section detected by the first detection section further comprises a finger pushing pressure applied to a pressure detection area formed on the touch panel display section.

9. The apparatus of claim 1, wherein:
the touch panel display section is flexible; and
the external force applied to the touch panel display section detected by the first detection section comprises a deformation of the touch panel display section.

10. The apparatus of claim 1, wherein:
the first detection section detects a magnitude of the external force applied to the touch panel display section; and
the display control section performs the digital page turning operations of the electronic information displayed on the touch panel display section at a speed corresponding to the magnitude of the external force.

11. The apparatus of claim 1, wherein:
the external force applied to the touch panel display section comprises a bending operation of the touch panel display section.

12. The apparatus of claim 11, wherein:
the external force further comprises a bending force;
the first detection section detects the bending force of the bending operation of the touch panel display section; and the display control section performs the digital page turning operations of the electronic information displayed on the touch panel display section based further on the bending force of the bending operation of the touch panel display section.

13. The apparatus of claim 11, wherein:
the external force further comprises a bending force;
the first detection section detects an angle at which the touch panel display section is bent by the bending force of the bending operation on the touch panel display section; and
the display control section performs the digital page turning operations of the electronic information displayed on the touch panel display section based further on the angle at which the touch panel display section is bent.

14. A method, comprising:
detecting an external force applied, by a user, around and along an axis (δ) that extends between a top portion and a bottom portion of a touch panel display section of an information processing device that displays electronic information of a digital book arranged in units of a digital page;
detecting a finger operation on the touch panel display section; and
performing digital page turning operations of the electronic information displayed on the touch panel display section to turn one or more digital pages of the digital book,
wherein:
  performing the digital page turning operations of the electronic information are based on a combination of the detection result of the external force and a detection result of the finger operation,
  in response to the external force being applied to the touch panel display section, the touch panel display section is configured to warp analogous to a physical book to imitate the user turning one or more physical pages of the physical book,
  the digital page turning operations are performed in response to detecting the external force, and
  the digital page turning operations are performed at a page turning speed based on an amount the touch panel display warps in response to the external force being applied to the touch panel display section.

15. The method of claim 14, wherein:
performing the digital page turning operations of the electronic information are performed at the page turning speed further based on the detection result of the finger operation.

16. The method of claim 14, wherein:
the detection result of the external force comprises a magnitude of the external force; and
performing the digital page turning operations of the electronic information are performed at the page turning speed based on the magnitude of the external force.

17. The method of claim 14, wherein:
the external force comprises a bending force of a bending operation of the touch panel display section.

18. A computer program product comprising a non-transitory computer-readable storage medium that stores code executable by a processor, the executable code comprising code to perform:
detection of an external force applied, by a user, around and along an axis (δ) that extends between a top portion and a bottom portion of a touch panel display section of an information processing device that displays electronic information of a digital book arranged in units of a digital page;
detection of a finger operation on the touch panel display section; and
digital page turning operations of the electronic information displayed on the touch panel display section to turn one or more digital pages of the digital book,
wherein:
  the digital page turning operations of the electronic information displayed on the touch panel display section is based on a combination of the detection result of the external force and a detection result of the finger operation,
  in response to the external force being applied to the touch panel display section, the touch panel display section is configured to warp analogous to a physical book to imitate the user turning one or more physical pages of the physical book,
  the digital page turning operations are performed in response to detecting the external force, and
  the digital page turning operations are performed at a page turning speed based on an amount the touch panel display warps in response to the external force being applied to the touch panel display section.

19. The computer program product of claim 18, wherein:
executable code further comprises code to perform:
the digital page turning operations are performed at the page turning speed further based on the touch panel display section and the detection result of the finger operation.

20. The method of claim 14, wherein:
the page turning speed is proportional to a magnitude the touch panel display warps in response to the external force being applied to the touch panel display section.

* * * * *